United States Patent
Lin et al.

(10) Patent No.: US 7,894,407 B2
(45) Date of Patent: Feb. 22, 2011

(54) METHOD AND APPARATUS FOR SEAMLESS ROAMING FOR WIRELESS NETWORKS

(75) Inventors: Chueng-Hsien Lin, Cranbury, NJ (US); Sanjoy Paul, Morganville, NJ (US); Sampath Rangarajan, Bridgewater, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 414 days.

(21) Appl. No.: 11/089,736

(22) Filed: Mar. 25, 2005

(65) Prior Publication Data

US 2006/0215623 A1    Sep. 28, 2006

(51) Int. Cl.
*H04Q 7/24* (2006.01)

(52) U.S. Cl. .............. 370/338; 370/395.31; 370/331; 455/456.1; 455/432.1

(58) Field of Classification Search .......... 455/456.1, 455/432.1; 370/338
See application file for complete search history.

(56) References Cited

U.S. PATENT DOCUMENTS

| | | | |
|---|---|---|---|
| 6,490,259 B1 | 12/2002 | Agrawal et al. | |
| 6,535,493 B1 | 3/2003 | Lee et al. | |
| 6,957,262 B2 * | 10/2005 | Kimura et al. | 709/227 |
| 7,006,472 B1 * | 2/2006 | Immonen et al. | 370/332 |
| 7,016,682 B2 * | 3/2006 | Won et al. | 455/445 |
| 2002/0154638 A1 | 10/2002 | Shahrier et al. | |
| 2005/0148345 A1 * | 7/2005 | Kawai et al. | 455/456.3 |
| 2006/0136694 A1 * | 6/2006 | Hasbun et al. | 711/173 |

FOREIGN PATENT DOCUMENTS

| | | |
|---|---|---|
| EP | 1 589 719 A | 10/2006 |
| WO | WO 03/077429 A | 9/2003 |

OTHER PUBLICATIONS

Partial Search Report in corresponding EP 06 25 1059, Apr. 20, 2006, Lucent Technologies Inc.
Hinden R et al: "Virtual Router Redundancy Protocol (VRRP); rfc3768.txt;" IETF Standard, Internet Engineering Task Force, IETF, CH, Apr. 2004, XP015009548 ISSN: 0000-0003.

* cited by examiner

*Primary Examiner*—Temica M Beamer
(74) *Attorney, Agent, or Firm*—Wall & Tong, LLP (57) ABSTRACT

A method and apparatus for seamless roaming support for wireless networks is disclosed. The method includes broadcasting a request for a physical address of a default router related to a mobile unit; receiving the request at the default router; replying to the mobile unit; and creating an initial entry in a location table.

21 Claims, 7 Drawing Sheets

| MOBILE IP ADDRESS | MOBILE PHYSICAL ADDRESS | SERVING AP IP ADDRESS | ENTRY ACCESS TIME |
|---|---|---|---|
| 10.1.1.100 | 00:0c:f1:37:32:fa | 135.180.135.13 | t_access |
| 10.1.1.101 | 00:0c:f2:7a:bf:b5 | 135.180.145.15 | t_access |
| ... | ... | ... | ... |

FIG. 4

LOCATION UPDATE (L1) MESSAGE: (10.1.1.100, 00:0c:37:32fa, 135.180.135.13)

| MOBILE IP ADDRESS | MOBILE PHYSICAL ADDRESS | SERVING AP IP ADDRESS | ENTRY ACCESS TIME |
|---|---|---|---|
| 10.1.1.100 | 00:0c:f1:37:32:fa | 135.180.135.13 | t_access |
| ... | ... | ... | ... |
| ... | ... | ... | ... |

LOCATION TABLE AT THE AR

AR

L1 msg

METHOD AND APPARATUS FOR SEAMLESS ROAMING FOR WIRELESS NETWORKS

GOVERNMENT RIGHTS IN THIS INVENTION

The United States government may have certain rights in this invention. A portion of the work described herein was supported by a grant from the National Science Foundation ORBIT Grant Project No. NSF ANI-0335244.

BACKGROUND OF THE INVENTION

Field of the Invention

Embodiments of the present invention generally relate to wireless networks and in particular, to seamless roaming between access points in different IP subnets in a wireless network.

The use of wireless devices (also referred to herein as "mobile units") is becoming more prevalent due, in part, to the versatility and mobility of such devices. In many practical applications, wireless devices use wireless networks to communicate with each other. To communicate with hosts on a wired network (e.g., the Internet), the wireless devices need to be connected to a wireless local area network (WLAN) using, for example, an IEEE 802.11 standard protocol wireless network (hereinafter referred to as an "802.11 wireless network" or "802.11 WLAN") and devices known as access points (APs).

An AP or wireless access point (WAP) is equipped with an interface that then connects the wireless devices to a wired network like the Ethernet. An AP may also include a wireless interface that connects wireless communication devices to create a wireless network. Mobile units can access the Internet, for example, via a device called an access router (AR), which forwards packets from mobile units to hosts on the wired network through the AP's.

The coverage area of an AP is limited (e.g., about one hundred to two hundred feet indoors). Therefore, multiple APs are needed to cover a large area. There are two approaches for deploying multiple APs. The first is where the APs function as link-layer (layer-2) bridges. The second is where the APs function as network-layer (layer-3) routers. In the first approach (layer-2 approach), the AR, the APs and all the mobile units are on the same IP subnet. In the second approach (layer-3), which is more flexible in terms of deployment, the APs can reside on different IP subnets, function as IP routers to the mobile units and communicate with the AR using IP packets instead of link-layer frames.

One of the main design issues in the deployment of 802.11 WLANs is the issue of seamless roaming support for mobile units within the wireless network. Mobility has to be supported without any, or at least a minimum of, service disruptions. For example, application level sessions should not be disrupted during handoffs between APs that provide link-layer connectivity to the mobile unit. If the APs are within the same IP subnet, a layer-2 handoff mechanism, inherent in 802.11 WLANs, would be sufficient to handle seamless mobility. If the APs are attached to different IP subnets, however, layer-3 handoff mechanisms would need to be employed to support the seamless mobility.

Layer-2 mechanisms have limitations. For instance, deployment in a wide area, linking every AP to one cable or one network presents an issue. It is more desirable to place the APs in the IP (or network) level in order to attach the APs to different IP sub-networks, allowing for more versatility. For one network to talk to another network, the handoff must be at the IP level (i.e., layer-3).

Known mechanisms for layer-3 mobility exist. For example, one layer-3 mobility mechanism is called Mobile-IP. However, Mobile-IP and related mechanisms are tailored towards nomadic connectivity and not for continuous mobility and frequent handoffs between APs that would occur in an 802.11 WLAN environment. Furthermore, Mobile-IP support is not widely available at the present time. For example, mobile units running MS Windows or Linux operating systems require the installation of additional software to use Mobile-IP.

Therefore, there is a need in the art for a seamless roaming support for 802.11 WLANs using a level-3 handoff scheme that can support frequent handoffs between APs and does not necessarily require installing additional software on the mobile units.

SUMMARY OF THE INVENTION

Embodiments of the present invention generally relate to a method and apparatus for a routing update scheme to ensure packets are delivered to the correct serving AP for each mobile unit and thus provide for a seamless roaming support for 802.11 wireless networks. The methods and apparatus provide for a low latency handoff scheme for 802.11 wireless mobile units roaming among APs connected to different IP subnets. The methods and apparatus use link-level frames to send route updates to the mobile units. The IP packet routing to and from a mobile unit can begin soon after the mobile unit establishes a link-level association with a new AP.

In accordance with an embodiment, there is provided a network communication system for providing seamless roaming support to mobile units on a wireless network, comprising: at least two access points (APs), each having a wired interface port and a wireless interface port, the wireless interface port adapted to be coupled to the mobile units; an access router (AR) adapted to be coupled to the wired interface port of each of the at least two APs; and a location table for providing routing information of the mobile units to the AR. In accordance with another embodiment of the present invention, there is provided a method for routing an IP packet toward a mobile unit, comprising: receiving the IP packet at an AR; identifying a mobile unit location using a location table, the location table containing the destination IP address of a serving AP; retrieving the destination IP address of the serving AP from the location table; and associating with the IP packet the IP address of the serving AP such that the IP packet is adapted for transmission to the mobile unit via the serving AP.

In accordance with another embodiment of the present invention, there is provided a method for creating the initial routing entry in the location table for a mobile unit that initiates communication in the system the first time, comprising: selecting a nearby AP by the mobile unit as the serving AP; broadcasting an ARP message for a virtual default router IP address (IPvdr address) by the mobile unit; sending a response to the ARP for the IPvdr address to the mobile unit from the serving AP; processing the ARP response by the mobile unit to create an ARP cache entry; and sending a message from the serving AP to the AR to create the initial routing entry in the location table for the mobile unit.

In accordance with another embodiment of the present invention, there is provided a method for updating an existing routing entry in the location table for a mobile unit, comprising: selecting a new serving AP by the mobile unit; associating with the new serving AP by the mobile unit; sending a routing update message from the new serving AP to the AR; processing the route update message by the AR to update the routing entry corresponding to the mobile unit in the location table; sending a gratuitous ARP message from the new serving AP to the mobile unit to update the ARP cache entry corresponding to the IPvdr address.

In accordance with a further embodiment of the present invention, there is provided a method for communicating between a mobile unit and a host, comprising: providing a probing signal from the mobile unit to locate nearby APs; processing responses from nearby APs; associating with the selected serving AP; broadcasting an ARP message for an IPvdr address, wherein a response is sent to the ARP for the IPvdr address of the mobile unit; sending a first message to the AR; and processing the ARP response and creating an ARP cache entry, wherein the first message is used to create an initial routing entry in a location table.

BRIEF DESCRIPTION OF THE DRAWINGS

So the manner in which the above recited features of the present invention can be understood in detail, a more particular description of the present invention, briefly summarized above, may be had by reference to embodiments, some of which are illustrated in the appended drawings. It is to be noted; however, the appended drawings illustrate only typical embodiments of the present invention and are therefore not to be considered limiting of its scope, for the present invention may admit to other equally effective embodiments.

While embodiments of the present invention are described herein by way of example using several embodiments and illustrative drawings, those skilled in the art will recognize the present invention is not limited to the embodiments and drawings described. It should be understood the drawings and detailed description thereto are not intended to limit the present invention to the particular form disclosed, but on the contrary, the present invention is to cover all modifications, equivalents and alternatives falling within the spirit and scope of the present invention as defined by the appended claims.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Embodiments of the present invention include methods and apparatus for providing mobile units the capability to roam from one access point (AP) to another AP (where the APs are on different IP subnets) while maintaining at least their TCP connections and application sessions (e.g., HTTP session, Voice Over IP session, and the like). In accordance with embodiments of the present invention, the apparatus is able to perform frequent mobile unit layer-3 handoffs between APs. The mobile units are able to roam within the 802.11 wireless networks using known operating systems (e.g., Windows XP or Linux) without modifications. Embodiments of the present invention are arranged such that there is no need for loading any special kernel modules or running application processes on the mobile units to support mobility.

Embodiments of the present invention include using a fixed virtual default router IP (IPvdr) address for all the mobile units, using a fixed IP address for each active mobile unit, and issuing router updates based on the arrival of Address Resolution Protocol (ARP) frames and IEEE 802.11 management frames.

Figure 1:
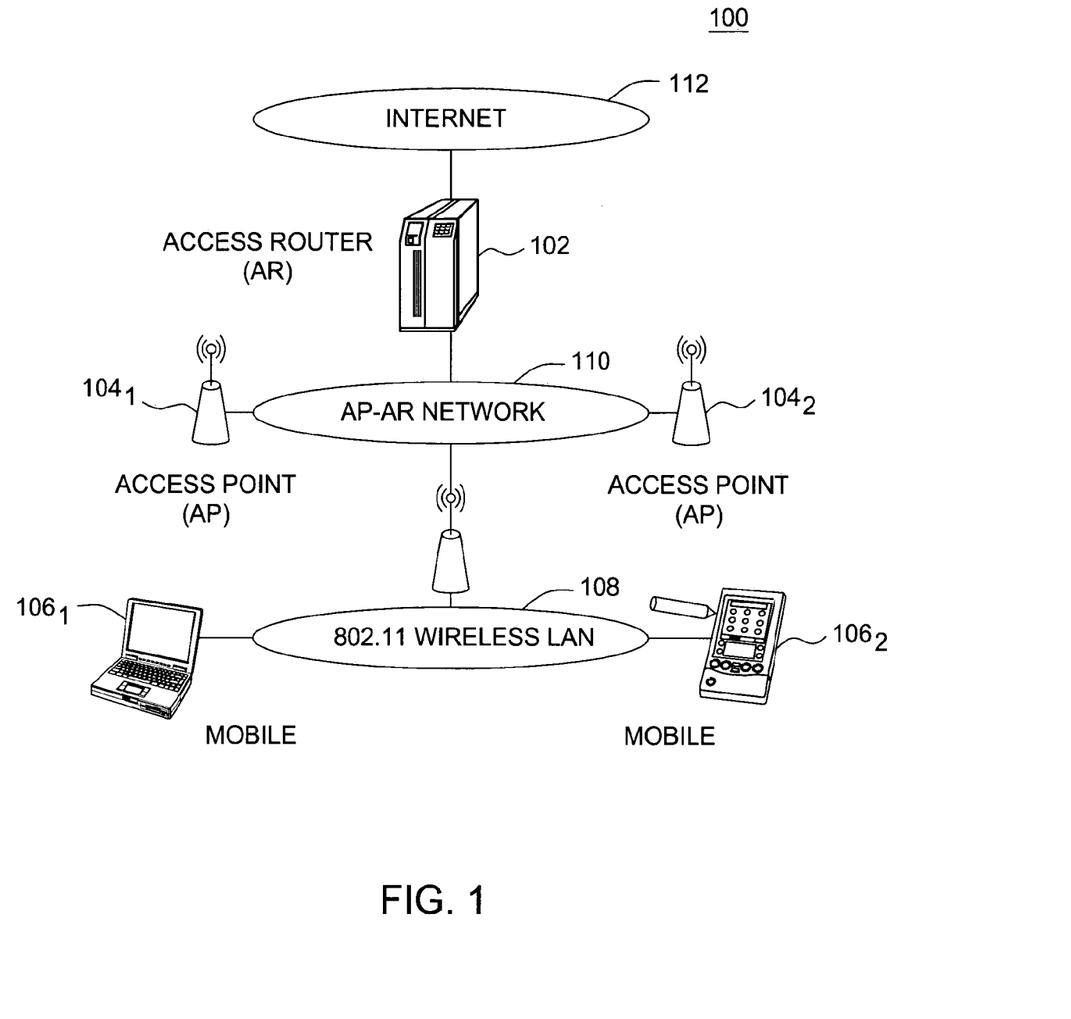
FIG. 1 is a system block diagram illustrating a network architecture used to support seamless roaming in accordance with an embodiment of the present invention.

FIG. 1 illustrates a network architecture 100 used in connection with embodiments of the present invention. The network architecture 100 includes a wired network 110, referred to as an AP-AR network, which connects the access router (AR) 102 with the APs 104. A wired network, for example, the Internet, 112, is also connected to the AR 102. The 802.11 WLAN network 108 and mobile units $106_1$ and $106_2$ are connected to the AP-AR network 110.

As discussed herein, hosts connected to the AP-AR network 110 (i.e., the AR 102 and the APs $104_1$ and $104_2$) do not need to reside in the same IP subnet. For example, the wired interface of AP1 ($104_1$) can be configured to an IP address of 135.180.145.15, while the wired interface of AP2 ($104_2$) could be configured with an IP address of 135.104.20.99. Because an AP can be attached to any IP subnet and mobile units can roam from the area of one AP to the area of another AP, the routing update scheme described herein, in accordance with an embodiment of the present invention, ensures packets are delivered to the correct serving AP for each mobile unit.

Figure 2:
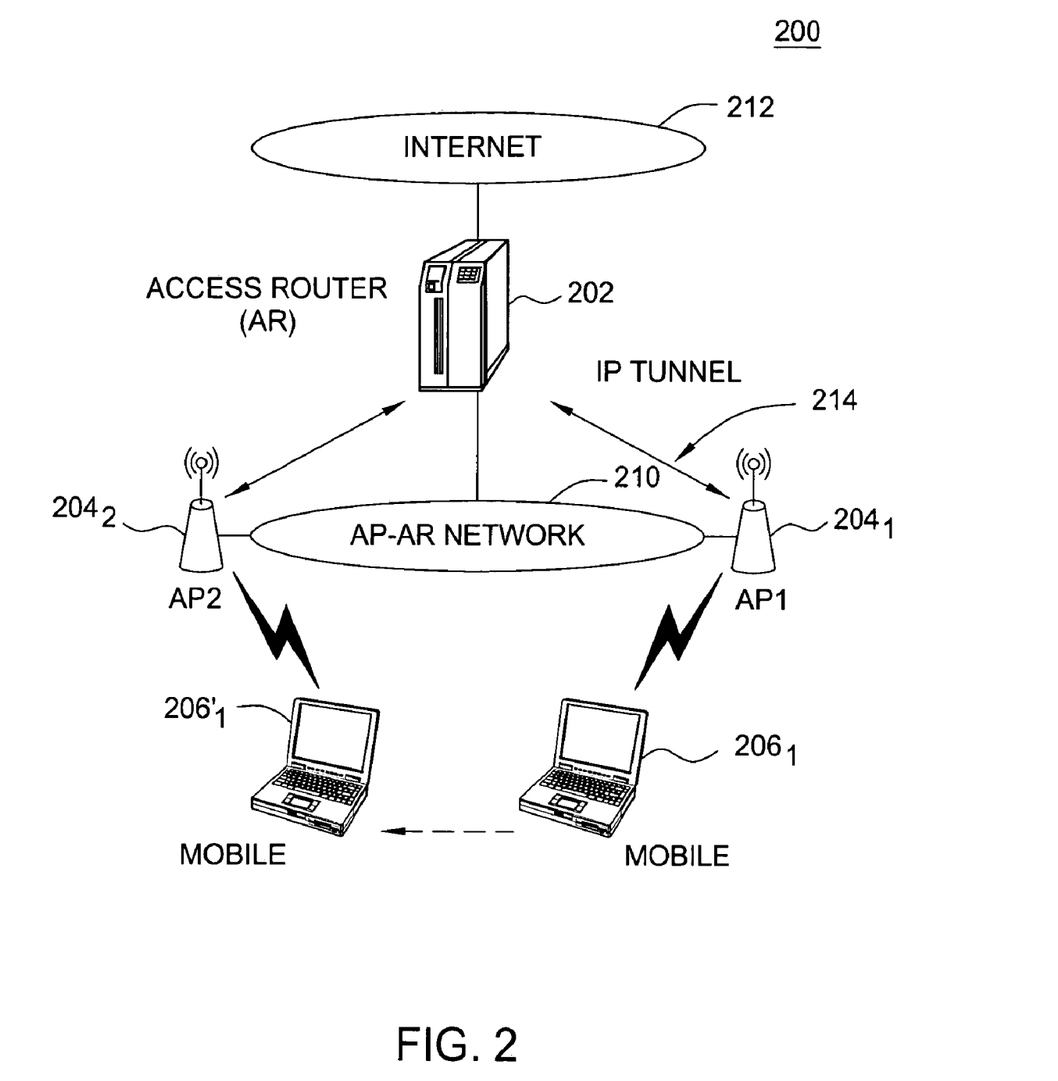
FIG. 2 is a system block diagram illustrating a mobile unit roaming from the area AP1 to the area AP2 in accordance with an embodiment of the present invention.

FIG. 2 depicts a network architecture 200 similar to the network architecture of 100. This figure illustrates mobile unit 206 roaming from position $206_1$ to $206'_1$. Specifically, in one embodiment, a mobile unit $206_1$ accesses the Internet 212 via the AP1 ($204_1$) and the AR 202. As the mobile unit $206_1$ moves away from the area of access of the serving AP1 ($204_1$), and enters the area of AP2 ($204_2$), the mobile unit $206_1$ detects AP2 ($204_2$) and exchanges 802.11 management frames to establish an association with AP2 ($204_2$). Once the association is established, AP2 ($204_2$) begins accepting packets from the mobile unit $206'_1$.

To support seamless transition, in accordance with embodiments of the present invention, of network connectivity, the AP2 ($204_2$) informs the AR 202 that it is now the serving AP of the mobile unit $206'_1$ so the AR 202 can then forward the packets destined for the mobile unit $206'_1$ to the AP2 ($204_2$). In addition, the AP2 ($204_2$) must inform the mobile unit $206'_1$ so the mobile unit can deliver packets destined for the Internet 212 to the now serving AP2 ($204_2$). The details of packet forwarding between the AR 202 and the mobile unit 206, via an AP 204, are described herein.

In operation, when an IP packet destined for a mobile unit $206_1$ arrives, the AR 202 determines the current serving AP 204. In an embodiment, the AR 202 uses a technique known as IP tunneling 214 to deliver the packet to the serving AP 204. IP tunneling is generally described as where an AR, e.g., AR 202, adds a new IP header to the original IP packet from the Internet 212, using the address of the serving AP 204 as a destination. When the serving AP 204 receives the tunneling packet 214, the serving AP extracts the original IP packet from the payload and delivers it to the mobile unit 206 using the wireless interface 108.

In order to access the Internet 212, a mobile unit $206_1$ must be configured with an IP address and a default router IP address. The IP address allows the mobile unit $206_1$ to communicate with other hosts on the Internet 212. The default router is the first hop router to the Internet. It is to be understood that the mobile units $206_1$ use their serving AP 204 as the default router. Delivering an IP packet from a mobile unit $206_1$ to the AR 202 takes two sequential steps. First, the mobile unit $206_1$ encapsulates the packet in an 802.11 frame and delivers the resulting frame to the serving AP 204. Second, the serving AP 204 delivers the packet to the AR 202 using IP tunneling 214, similar to the way packets are delivered from the AR to the mobile unit via the AP, as described previously.

This two step delivery requires two sets of information: the IP address of the AR 202 at the AP 204; and the physical address of the serving AP 204 at the mobile unit $206_1$. The IP address of the AR is part of the configuration information an AP acquires during bootstrapping. The physical address of the serving AP can be obtained dynamically by using the ARP protocol. Once a mobile unit $206_1$ obtains the physical address of its default router, the information is kept in the mobile's ARP cache for a period of time (e.g., two minutes or so) to reduce ARP request traffic. The mobile unit $206_1$ will then change the serving AP physical address in its ARP cache when it switches serving APs because each AP has a unique physical address.

The network architecture 200, in accordance with embodiments of the present invention, uses one IP address per mobile unit, and the IP address remains the same while the mobile unit is active, regardless of which AP the mobile unit is using. That is, a mobile unit does not need to change its IP address when it switches between APs. This feature ensures the TCP connections remain intact after a mobile unit switches to a new serving AP. In an alternative embodiment, where a mobile unit uses Dynamic Host Configuration Protocol (DHCP) to obtain its IP address, it is possible the mobile unit will issue a new DHCP request to the new AP for IP address information.

Embodiments of the present invention use each AP as a DHCP relay and the AR as the DHCP server. In this way, all the DHCP requests are forwarded to the AR for processing. Because the AR maintains a global location table (discussed hereinafter) for all active mobile units, the AR can assign the same IP address to the same mobile unit based on the unique physical address embedded in the wireless interface used by the mobile unit.

Figure 3:
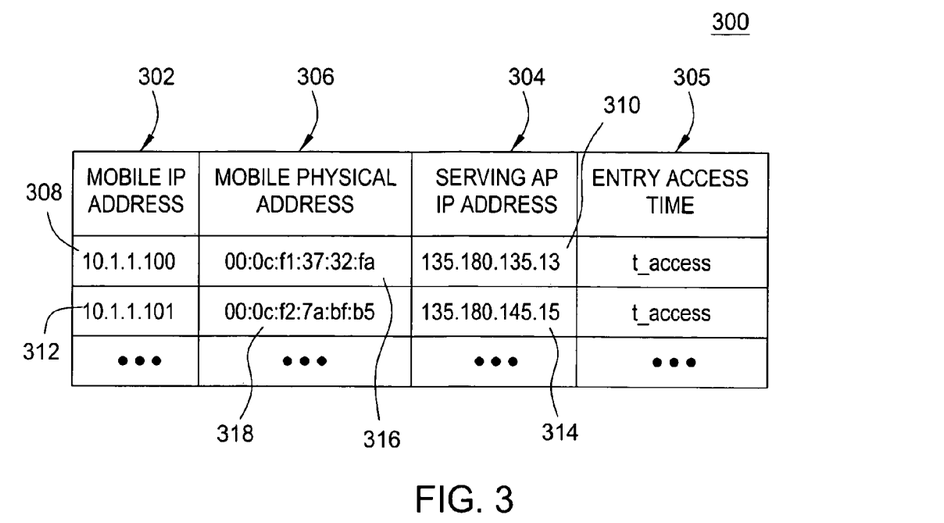
FIG. 3 is a location table at the access router (AR) in accordance with one embodiment of the present invention.

FIG. 3 illustrates the structure of a location table 300 for locating AP addresses in accordance with an embodiment of the present invention. The location table 300 provides the AR with routing information for each active mobile unit. Given an IP packet destined for a mobile unit, the AR uses the destination IP address 302 as a key to retrieve the entry corresponding to the mobile unit. The AR then delivers the IP packet to the serving AP of the mobile unit.

The location table 300 contains four essential sections: the mobile IP address field 302; the mobile physical address field 306; the serving IP address field 304; and the entry access time field 305. Additional fields are contemplated by the present invention and may be included in the location table 300 without departing from the scope of the present invention.

The mobile IP address field 302 stores the IP address assigned to a mobile unit. The mobile unit physical address field 306 stores the physical address of the 802.11 WLAN interface of a mobile unit. Both the mobile IP address and the mobile unit physical address fields are lookup keys for retrieving an entry. The serving AP address field 304 stores the IP address of the current serving AP of a mobile unit. This field is used by the AR to deliver packets destined for a mobile unit using IP tunneling as described above. The entry access time field 305 stores the time at which an entry is accessed. This field can be used to delete an inactive entry to conserve table space. As discussed previously, the DHCP server running at the AR also uses the location table 300 to ensure the same IP address 302 is assigned to the same mobile.

Although each mobile unit uses its serving AP as the default router and each AP has its own unique IP address, embodiments of the present invention use a unique, constant IP address as the default router IP address for all mobile units. This constant IP address is referred to herein as a Virtual Default Router IP Address (IPvdr). As a result, mobile units do not change their default router IP address when they switch APs. Each AP is programmed to recognize IPvdr and to answer ARP requests for it. This technique is known as Proxy-ARP.

When a mobile unit intends to initiate communication with a host outside its IP subnet, it must find the physical address (e.g., the Ethernet address) of its default router. Because it is configured with IPvdr as the default router, the mobile unit will broadcast an ARP request with IPvdr as the target IP address. When the serving AP receives the ARP request, it sends a reply to the requesting mobile unit. The reply contains the binding of IPvdr and the physical address of the serving AP, allowing the mobile unit to create an ARP cache entry for future communication with the serving AP. The ARP request targeted for IPvdr also contains the IP and physical addresses of the requesting mobile unit. This is important because the serving AP can use that information to create an initial location table entry at the AR as discussed herein.

Figure 4:
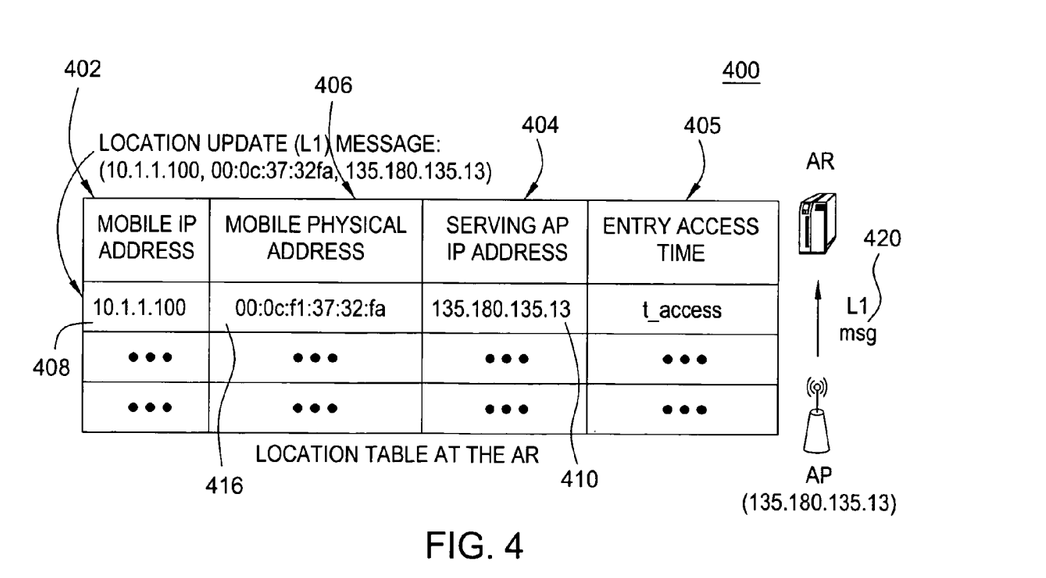
FIG. 4 is a location table at the AR illustrating an AP using an L1 message to create a new entry in the location table in accordance with an embodiment of the present invention.

In accordance with an embodiment of the present invention, there is provided a system for creating an initial routing state for a mobile unit at its ARP cache and at the AR when the mobile unit initiates communication. Referring to FIG. 4, the system comprises, using a location table 400: receiving an ARP request; extracting, by the serving AP, the source IP and physical addresses from the ARP request; and sending a location update L1 message 420 to the AR. The L1 message 420 contains the IP address 408 and physical address 416 of the mobile unit, as well as the IP address of the serving AP 410. After processing the L1 message, the AR creates a location table entry in the location table 400 corresponding to the mobile unit. The AR is able to forward packets destined for the mobile unit to its serving AP. Because an active mobile unit sends this ARP request periodically to refresh its ARP cache, the L1 message 420 also serves as a periodic update to keep the location table entry from being removed.

The ARP request targeted for IPvdr serves two purposes. First, the request triggers the serving AP to send the L1 message 420 to create a location table entry at the AR. Second, the reply to the request allows the mobile unit to learn the physical address 410 of its serving AP and to store that information in its ARP cache.

Figure 5:
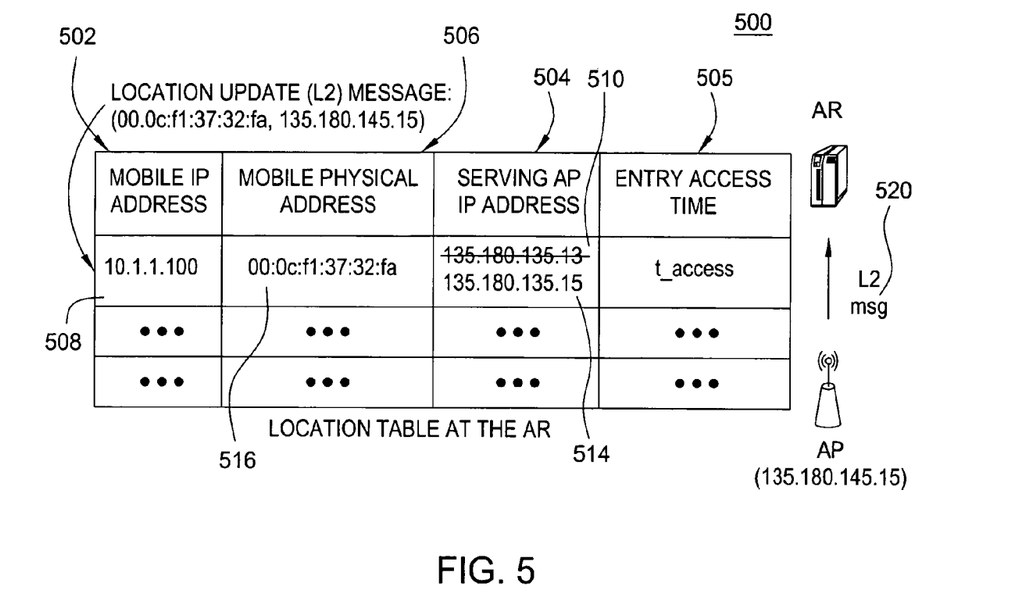
FIG. 5 is a location table at the AR illustrating the AP using an L2 message to modify the serving AP's IP address in the location table in accordance with an embodiment of the present invention.

FIG. 5 depicts a location table 500 illustrating an embodiment of the present invention relating to the seamless roaming support when a mobile unit moves from the area of one AP to the area of another AP. When a mobile unit moves to the area of a new AP and establishes an association with the new AP, the location table entry corresponding to the mobile unit at the AR and the ARP cache entry corresponding to IPvdr at the mobile unit must be modified to support seamless mobility. The new AP IP address 514 is different from the previous AP IP address 510.

In operation, the two entries are modified shortly after the new AP completes the association by sending two messages in succession from the new AP. A gratuitous ARP message is sent to the mobile unit and a new location update L2 message 520 is sent to the AR. The gratuitous ARP is an ARP request that contains the IPvdr and the physical address of the new AP as source. The purpose of this ARP request is not to elicit a response from the mobile unit. Instead, it is used to modify the ARP cache at the mobile unit. Before processing the gratuitous ARP, the mobile unit's ARP cache contains the binding of IPvdr to the physical address of the previous AP. After processing the gratuitous ARP, the mobile unit will change the binding of an IPvdr to the physical address of the new AP according to the ARP protocol specification, thus allowing the mobile unit to communicate with a new AP.

Unlike the L1 message 420 that creates a new entry in the location table (See FIG. 4), the L2 message 520 in FIG. 5 updates an existing entry in the table. Furthermore, the L2 message 520 does not contain the IP address of the mobile unit. Rather, it contains the physical address 516 of the mobile unit and the IP address of the new AP 514. When the AR receives the L2 message 520, the AR uses the physical address 516 as a lookup key to retrieve the entry corresponding to the mobile unit and replaces the serving AP IP address field with the IP address of the new AP. The section 504 and entries 510 and 514 demonstrate this process. This allows packets destined for the mobile unit to reach the new AP and then the mobile unit.

The gratuitous ARP and the L2 message complete the necessary updates needed to support seamless roaming at the most opportune time possible, i.e., shortly after a mobile unit establishes the association with a new serving AP.

Both the L1 and L2 messages require an acknowledgement from the AR. In particular, the acknowledgement to the L2 message contains the IP address of the mobile unit. The mobile IP address information, together with the mobile physical address, allows an AP to create an ARP cache entry in advance for the mobile unit that it just acquired. Thus, when a packet destined for the mobile unit arrives, the packet can be delivered to the mobile unit immediately, without broadcasting an ARP request to find the physical address of the mobile and wait for an ARP reply from the mobile.

Figure 6:
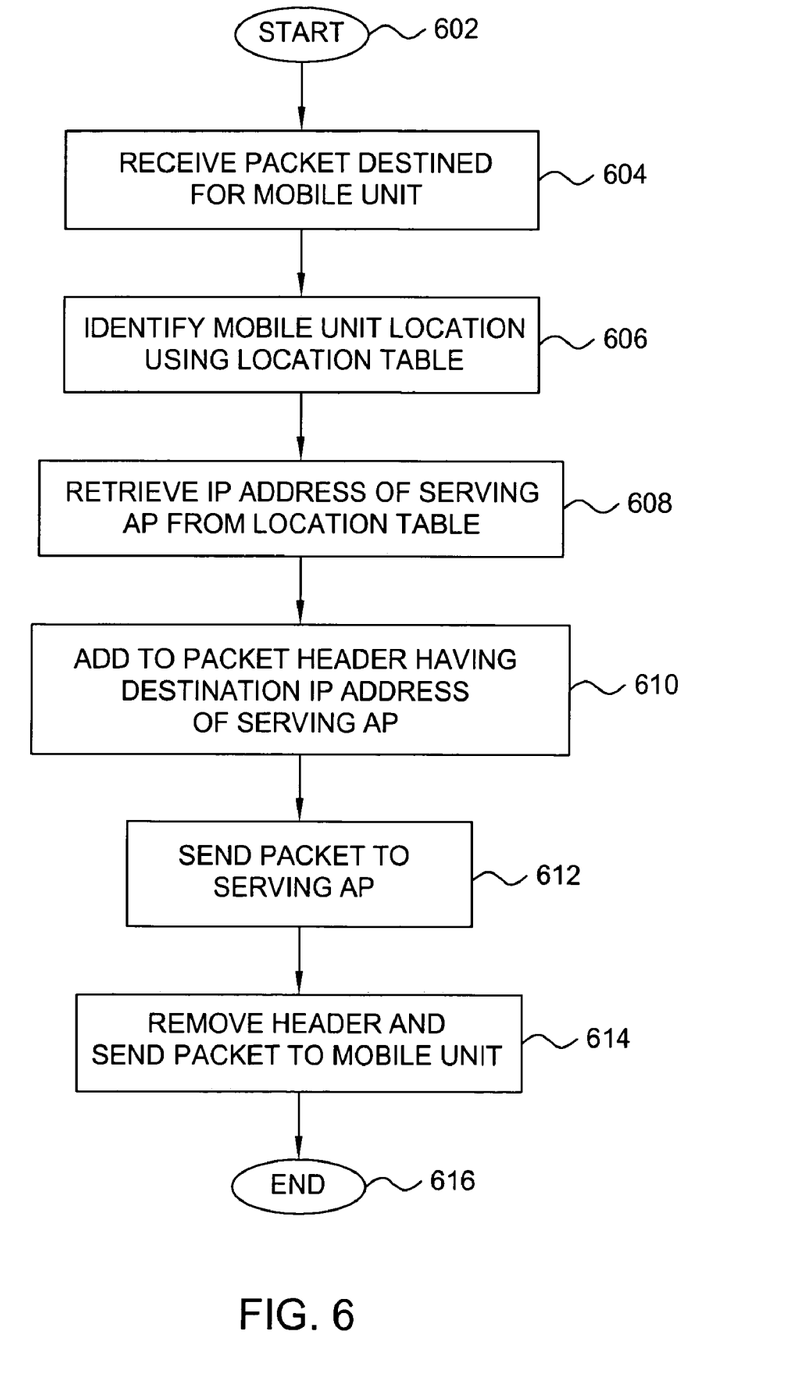
FIG. 6 is a flow diagram illustrating the movement of an IP packet from a wired network to a mobile unit in accordance with an embodiment of the present invention.

FIG. 6 is a flow diagram depicting a method, in accordance with an embodiment of the present invention, for receiving and sending an IP packet from a host such as the Internet to a mobile unit. The method comprises the steps of a host having a packet to send to a mobile unit 602. At step 604, the system receives the packet destined for the mobile unit. At step 606, the system identifies the mobile unit's location entry as described previously using a location table in accordance with an embodiment of the present invention. At step 608, the system retrieves the IP address of the serving AP from the location table. At step 610, the system adds a header to the packet using IP tunneling techniques as described previously.

The added header contains the IP address of the currently serving AP as destination. At step 612, the system sends the resulting packet to the serving AP. At step 614, the serving AP removes the added header and sends the resulting packet to the mobile unit. The method ends at step 616 until another packet is sent by the same or a different host.

Figure 7:
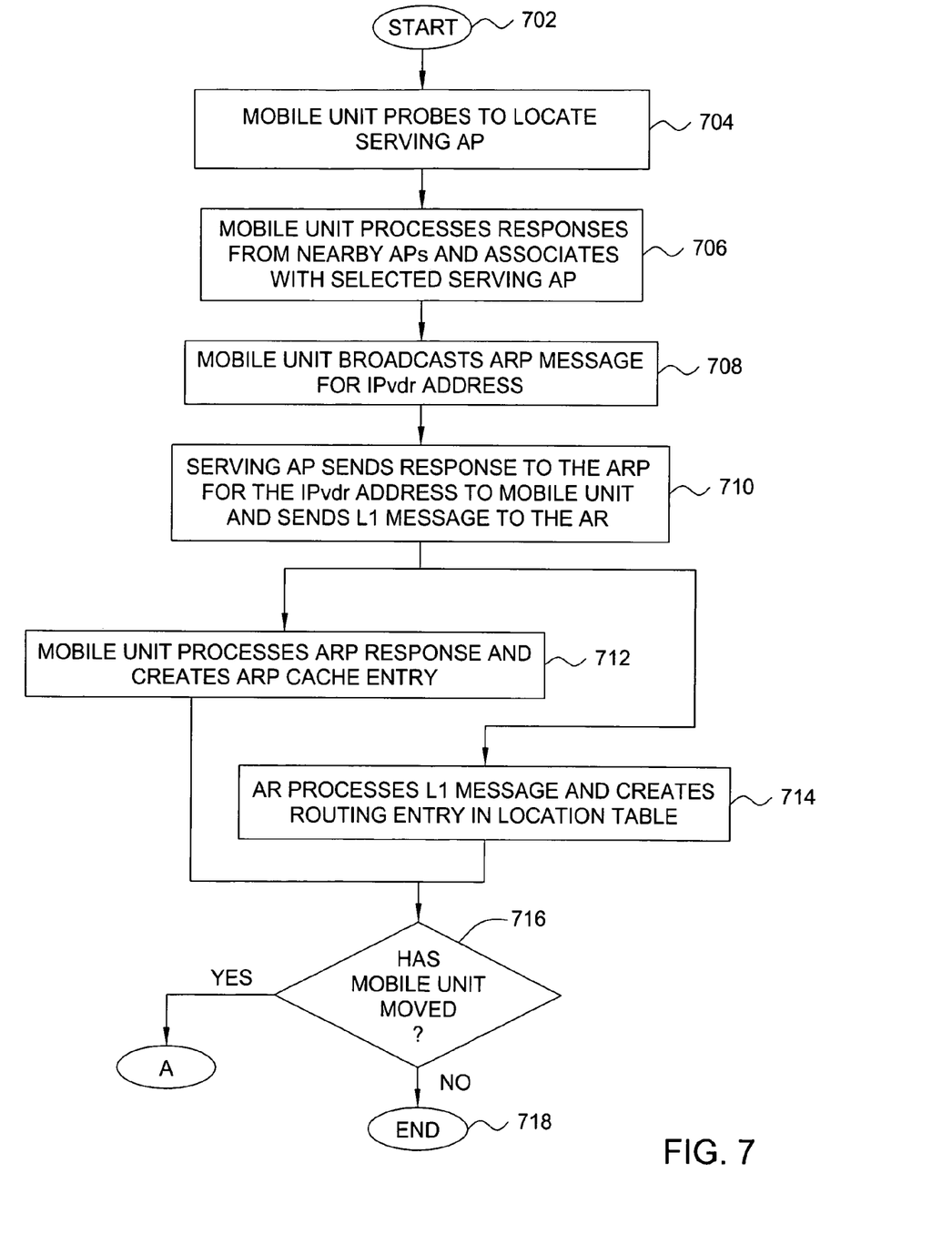
FIG. 7 is a flow diagram illustrating the creation of a new entry in the location table at the AR in accordance with an embodiment of the present invention.

In accordance with another embodiment of the present invention, as shown in FIG. 7, there is provided a flow diagram depicting the creation of an initial routing state for a mobile unit at its ARP cache and at the AR when the mobile unit initiates communication. The method begins at step 702. At step 704, the mobile unit sends out a probing signal, within the 802.11 WLAN, to locate an AP that it has permission to access. At step 706, the mobile unit processes the responses from the nearby APs and selects one with which to associate. The selected AP becomes the serving AP for the mobile unit. At step 708, when the mobile unit begins to communicate with a host in the wired network, the mobile unit sends out a broadcast ARP message for the IPvdr address. At step 710, the serving AP sends a response to the ARP for the IPvdr address to the mobile unit and also sends the L1 message to the AR. At step 712, the mobile unit processes the ARP response from the serving AP and creates an ARP cache entry that binds the IPvdr IP address to the physical address corresponding to the serving AP. At step 714, which in one embodiment is performed in parallel with step 712, the AR processes the L1 message from the mobile unit and creates a routing entry in the location table for the mobile unit. If the mobile unit remains in the same position and is not in search of a new serving AP for the time being, the method ends at step 718. If, alternatively, the mobile unit moves, then the system advances to step A (see FIG. 8).

Figure 8:
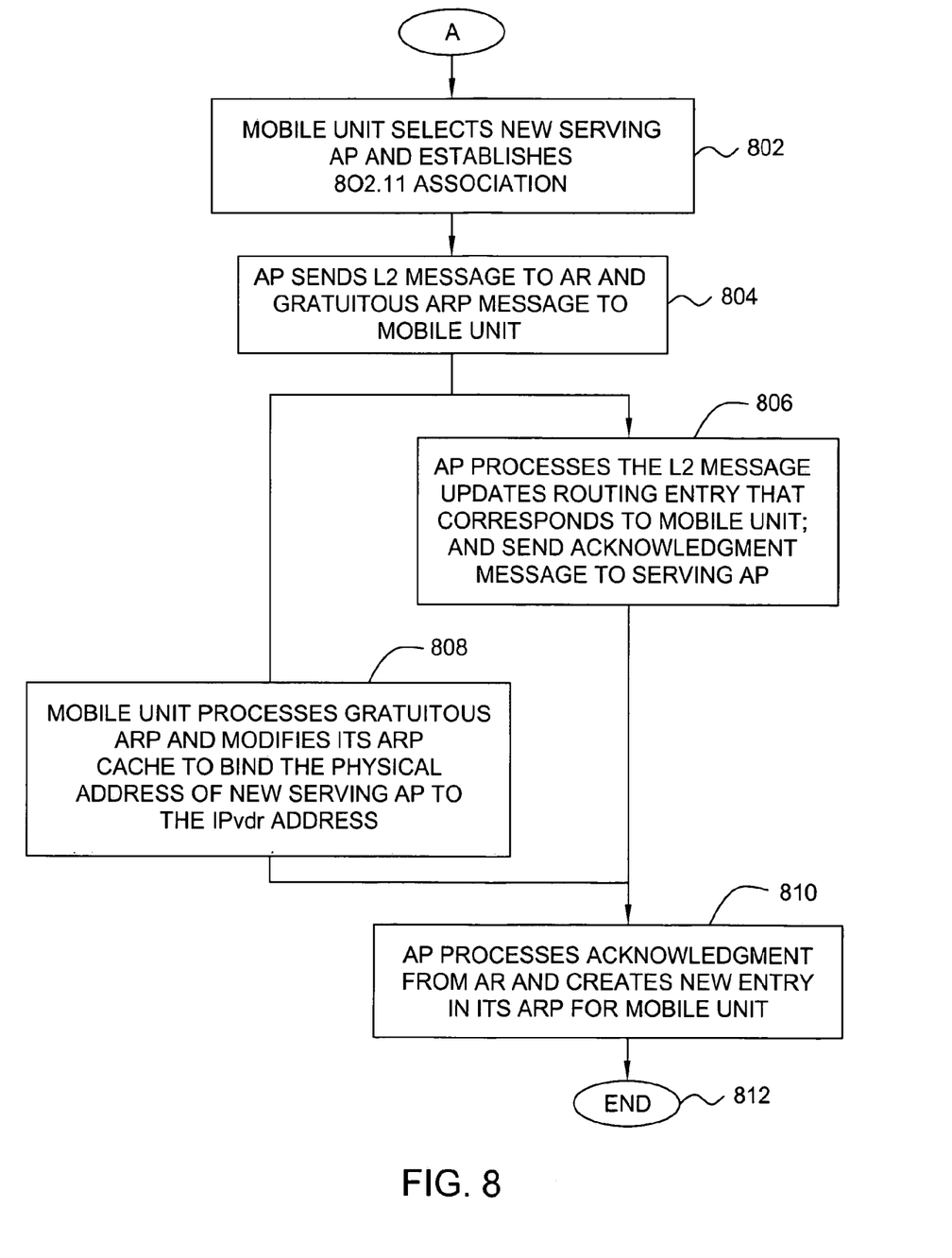
FIG. 8 is a flow diagram illustrating the updating of an existing entry in the location table at the AR in accordance with an embodiment of the present invention.

FIG. 8 is a flow diagram depicting if the mobile unit moves and a new serving AP is selected. The steps depicted in FIG. 8 are directed to updating the ARP cache entry corresponding to the IPvdr at the mobile unit and the routing entry in the location table that corresponds to the mobile unit. Specifically, in accordance with another embodiment of the present invention, there is provided the steps of updating the routing state for a mobile unit at its ARP cache and at the AR when the mobile unit moves from the area of its current serving AP to the area of a new serving AP.

At step 802, the mobile unit selects the new serving AP and establishes an 802.11 association with the new serving AP. At step 804, the new serving AP sends the L2 message to the AR and a gratuitous ARP message to the mobile unit. At step 806, the AR processes the L2 message, updates the routing entry in the location table that corresponds to the mobile unit, and sends an acknowledgement message back to the new serving AP. The update makes the new serving AP the current serving AP of the mobile unit. At step 808, which in one embodiment, proceeds in parallel with step 806, the mobile unit processes the gratuitous ARP from the new serving AP and modifies its ARP cache to bind the physical address of the new serving AP to the IPvdr address. At step 810, the new serving AP processes the acknowledgement from the AR and creates a new entry in its ARP for the mobile unit. The method ends at step 812.

EXAMPLE

The following example explains how an AR and AP support seamless mobility in accordance with embodiments of the present invention. Consider this example in connection with FIGS. 2, 4 and 5-8. Assuming a mobile unit boots up and is configured with IP address 10.1.1.100 and the default router IP address (IPvdr) is 10.1.1.1. When the mobile unit 206 establishes an association with AP1 (204₁), AP1 sends an L2 message 520 to the AR 202 and a gratuitous ARP to the mobile unit 206. Because the AR 202 does not have an entry for the mobile unit 206, it ignores the L2 message 520. Similarly, the mobile unit 206 ignores the gratuitous ARP because its ARP cache is empty.

When the mobile unit 206 initiates communication with a host (e.g., the Internet) for the first time, it sends out an ARP broadcast for the IPvdr (10.1.1.1). AP1 (204₁) answers the ARP request and sends an L1 message 420 to the AR 202, which uses the L1 message 420 to create a new entry 408 in the location table corresponding to the mobile unit. Once the location table (See FIG. 3) entry 308 is created at the AR 202 and the ARP cache entry that binds the IPvdr to the physical address of AP1 (204₁) is created at the mobile unit 206, the mobile unit 206 and the host 212 can communicate with each other.

When the mobile unit 206 moves to the area of AP2 (204₂), it establishes an association with AP2. Once the association is established, AP2 sends an L2 message 520 to the AR 202 and a gratuitous ARP to the mobile unit 206. The AR uses the physical address carried in the L2 message 520 as a look up key to retrieve the entry corresponding to the mobile unit 206 and replaces the serving AP IP address in the table 510 with AP2's IP address 514 (carried in the L2 message 520). The AR 202 then sends an acknowledgement that contains the IP address of the mobile unit 206 to AP2 (204₂). AP2 processes the acknowledgement and creates an entry in its ARP cache for the mobile unit 206.

Upon receiving the gratuitous ARP, the mobile unit 206 modifies its ARP cache, such that the IPvdr binds to the physical address of AP2. The L2 message 520 together with the gratuitous ARP completes the necessary routing update required to support seamless roaming in accordance with embodiments of the present invention.

Embodiments of the present invention advantageously do not require modifications to the mobile units. Each mobile unit maintains a fixed IP address and a fixed default router address as it moves from one AP to another. The access points and the AR cooperate to track each mobile unit and forward packets using IP tunneling.

While the foregoing is directed to embodiments of the present invention, other and further embodiments of the present invention may be devised without departing from the basic scope thereof, and the scope thereof is determined by the claims that follow.

What is claimed is:

1. A network communication system for providing seamless roaming support to mobile units on a wireless network, comprising:
   at least two access points (APs), each having a wired interface port and a wireless interface port, the wireless interface port adapted to be coupled to the mobile units; and
   an access router (AR) adapted to be coupled to the wired interface port of each of the at least two APs, wherein the AR comprises a location table including routing information of the mobile units;
   wherein each of the at least two APs in response to receiving an Address Resolution Protocol (ARP) request message including an IP address of a mobile unit, forwards to its wired interface port a message including a virtual default router IP (IPvdr) address as a target IP address suitable for use as the access router location table entry for the requesting mobile unit.

2. The network communication system of claim 1, wherein the at least two APs are network-layer routers and communicate with the AR using IP packets.

3. The network communication system of claim 1, wherein the wireless network is an IEEE 802.11 protocol wireless network.

4. The network communication system of claim 1, wherein the location table comprises:
   a mobile unit IP address field;
   a mobile unit physical address field;
   a serving AP IP address field; and
   an entry access time field.

5. The network communication system of claim 4, wherein the mobile unit IP address field stores an IP address assigned to a mobile unit.

6. The network communication system of claim 4, wherein the mobile unit physical address field stores the physical address of the wireless network interface of a mobile unit.

7. The network communication system of claim 4, wherein the serving AP IP address field stores the IP address of the current serving AP of a mobile unit, the IP address to be used by the AR to deliver packets adapted for transmission to the mobile unit.

8. The network communication system of claim 4, wherein the entry access time field stores the time at which an entry is accessed.

9. The network communication system of claim 1, wherein each of the mobile units comprise a constant virtual default router IP (IPvdr) address.

10. A method for communicating between a mobile unit and a host, comprising:
    providing a probing signal from the mobile unit to locate nearby access points (APs);
    processing responses from nearby APs;
    associating with one of the nearby APs selected as a serving AP;
    broadcasting, from the mobile unit, an ARP request message, wherein the Address Resolution Protocol (ARP) request message includes a virtual default router IP (IPvdr) address, wherein the ARP request message further comprises a physical address of a serving AP at the mobile unit and an IP address of the mobile unit;
    sending a first message to an access router (AR), wherein the first message is used to create a routing entry in a location table of the AR;
    receiving, at the mobile unit, an ARP response message; and
    processing the ARP response message and creating an ARP cache entry.

11. The method of claim 10, wherein the step of processing the ARP response message comprises binding the IPvdr address and the physical address of the serving AP.

12. The method of claim 11, wherein the binding step provides the mobile unit with information to communicate with the serving AP and to create the ARP cache entry.

13. The method of claim 12, further comprising:
    extracting the IP and physical addresses from the ARP request message.

14. The method of claim 10, wherein the first message comprises the IP and physical addresses of the mobile unit and the IP address of the serving AP.

15. The method of claim 10, further comprising:
    forwarding IP packets destined for the mobile unit to the serving AP using the routing entry in the location table.

16. The method of claim 10, wherein, if the mobile unit moves to a new location in an area of a new serving AP, the method further comprises:
    updating, at the AR, the routing entry of the location table corresponding to the mobile unit; and updating the ARP cache entry corresponding to the IPvdr address at the mobile unit.

17. The method of claim 16, wherein
the step of updating the ARP cache entry at the mobile unit comprises sending a gratuitous ARP message to the mobile unit to modify the ARP cache at the mobile unit, and
the step of updating the routing entry at the AR comprises sending a location update message to the AR.

18. The method of claim 17, further comprises:
sending an acknowledgement from the AR to the new serving AP in response to the location update message, wherein the acknowledgement includes the IP address of the mobile unit.

19. The method of claim 18, further comprising:
creating, at the new serving AP, a new ARP cache entry for the mobile unit using the mobile unit IP address carried in the acknowledgement message.

20. An access point (AP) for providing seamless roaming support to mobile units in a wireless network, the AP comprising:
a wired interface port adapted for communicating with an access router, and a wireless interface port adapted for communicating with mobile units;
the AP, in response to receiving an Address Resolution Protocol (ARP) request message including an IP address of a mobile unit, forwards to its wired interface port a message including a virtual default router IP (IPvdr) address as a target IP address suitable for use as the access router location table entry for the requesting mobile unit.

21. The apparatus of claim 20, wherein the AP is a network-layer router and communicates with the AR using IP packets.

* * * * *